(12) United States Patent
Henry et al.

(10) Patent No.: US 7,914,874 B2
(45) Date of Patent: Mar. 29, 2011

(54) FUGITIVE PORE FORMER FOR POROUS CERAMIC ARTICLES

(75) Inventors: David Henry, Morigny-Champigny (FR); Yves A. H. Brocheton, Samoreau (FR)

(73) Assignee: Corning Incorporated, Corning, NY (US)

( * ) Notice: Subject to any disclaimer, the term of this patent is extended or adjusted under 35 U.S.C. 154(b) by 449 days.

(21) Appl. No.: 12/059,082

(22) Filed: Mar. 31, 2008

(65) Prior Publication Data
US 2009/0057939 A1 Mar. 5, 2009

(30) Foreign Application Priority Data

Aug. 28, 2007 (EP) .................................... 07301328

(51) Int. Cl.
*B32B 3/12* (2006.01)
*C04B 38/00* (2006.01)
*C04B 35/64* (2006.01)

(52) U.S. Cl. ............ 428/116; 501/80; 501/85; 428/689; 428/702; 428/402; 264/43; 264/44; 264/46.4; 264/630

(58) Field of Classification Search .................. None
See application file for complete search history.

(56) References Cited

U.S. PATENT DOCUMENTS

| 5,185,108 A | 2/1993 | Shimandle ...................... 264/11 |
| 5,258,150 A | 11/1993 | Merkel et al. ................... 264/43 |
| 5,531,794 A * | 7/1996 | Takagi et al. ............... 623/23.56 |
| 6,063,322 A | 5/2000 | Draxler et al. ................. 264/428 |
| 6,432,856 B1 | 8/2002 | Beall ............................. 501/118 |
| 2005/0025933 A1* | 2/2005 | Masukawa et al. ........... 428/116 |

FOREIGN PATENT DOCUMENTS

| EP | 0 350 070 | 1/1990 |
| JP | 56-157474 | 4/1981 |

OTHER PUBLICATIONS

Song, Ju-Ha, et al., "Fabrication of a Porous Bioactive Glass-Ceramic Using Room-Temperature Freeze Casting" *J. Am. Ceram. Soc.*, 89 [8] pp. 2649-2653 (2006).
Araki, Kiyoshi and Halloran, John W., "Porous Ceramic Bodies with Interconnected Pore Channels by a Novel Freeze Casting Technique", *J. Am. Ceram. Soc*, 88 [5] pp. 1108-1114 (2005).
Koh, Young-Hag, et al., "In situ Fabrication of a Dense/Porous Bi-layered Ceramic Composite using Freeze Casting of a Ceramic-Camphene Slurry", *J. Am. Ceram. Soc.*, 89 [2] pp. 763-766 (2006).
Studart, Andre R., et al., "Processing Routes to Macroporous Ceramics: A Review", *J. Am. Ceram. Soc.*, 89 [6] pp. 1771-1789 (2006).

* cited by examiner

*Primary Examiner* — Ling Xu
(74) *Attorney, Agent, or Firm* — John L. Haack

(57) ABSTRACT

Disclosed are ceramic batch compositions for forming porous ceramic articles. The ceramic forming precursor batch compositions include ceramic forming inorganic batch components and a cyclododecane pore forming agent. Also disclosed are methods for manufacturing porous ceramic articles.

24 Claims, 5 Drawing Sheets

100 μm

US 7,914,874 B2

FUGITIVE PORE FORMER FOR POROUS CERAMIC ARTICLES

CLAIMING BENEFIT OF PRIOR FILED APPLICATION

This application claims the benefit of European Application No. 07301328.6, filed on Aug. 28, 2007. The content of this document and the entire disclosure of publications, patents, and patent documents mentioned herein are incorporated by reference.

BACKGROUND

The disclosure relates to the manufacture of porous ceramic particulate filter articles, and more particularly to ceramic forming batch composition comprising a fugitive pore forming agent.

SUMMARY

The disclosure relates generally to ceramic forming batch compositions comprising cyclododecane as a fugitive pore forming agent. The cyclododecane pore former features an ability to be removed from a green body using a simple drying process prior to any firing step and without the resulting formation of cracks. In addition, the cyclododecane pore former can also be used in relatively high amounts, enabling the manufacture of porous ceramic articles with increased levels of porosity. Accordingly, the disclosed batch composition enable the fabrication of highly porous ceramic substrates suitable for use as diesel particulate filters (DPFs) having higher catalyst loadings, low pressure drop, and high strengths.

BRIEF DESCRIPTION OF THE DRAWINGS

The accompanying drawings illustrate embodiments of the disclosure and with the description further explain, without limitation, the disclosure.

DETAILED DESCRIPTION

Figure 1:
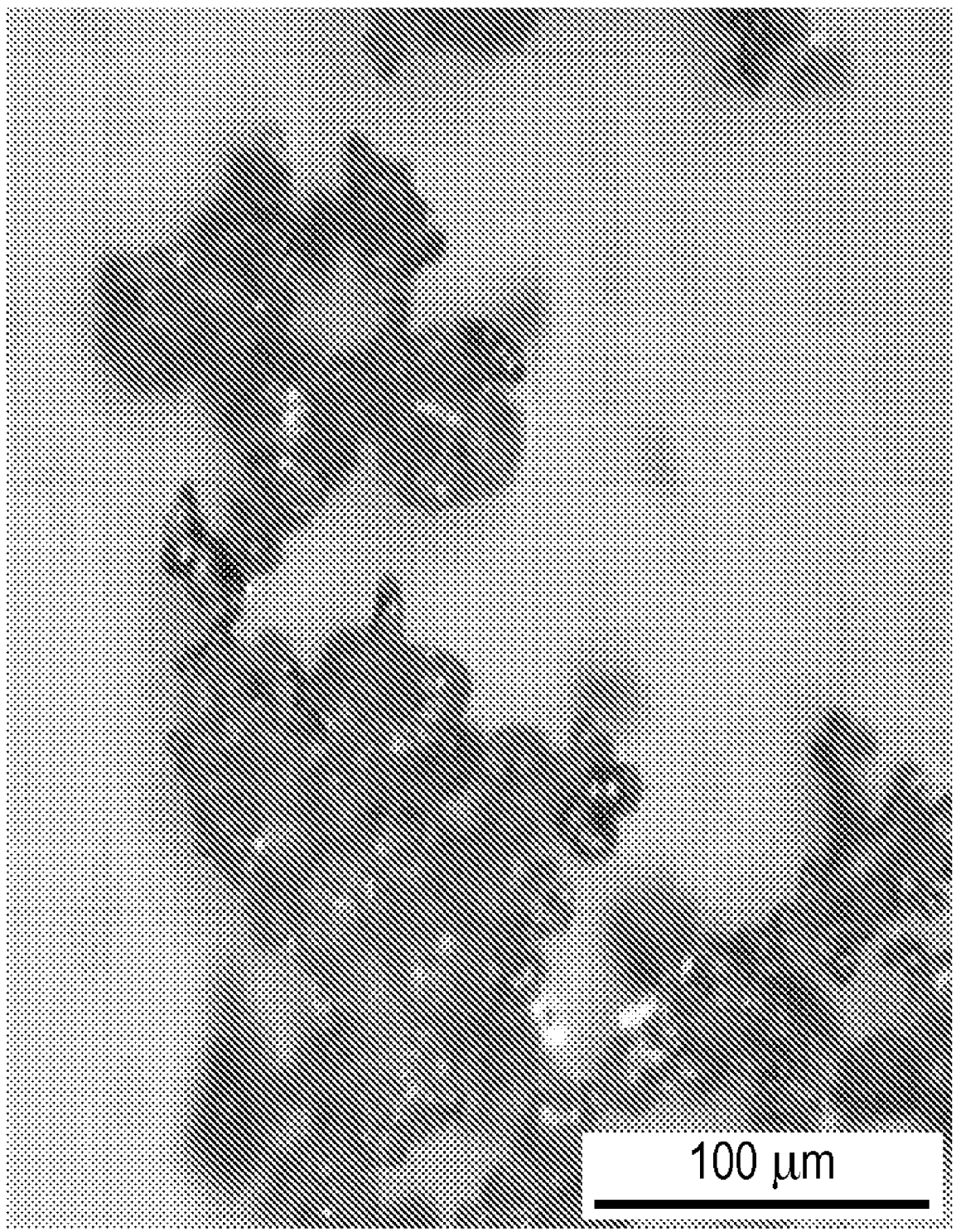
FIG. 1 illustrates exemplary cyclododecane particles.

Various embodiments of the disclosure will be described in detail with reference to drawings, if any. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In embodiments, the disclosure provides a plasticized ceramic precursor batch composition comprising ceramic forming inorganic batch components; and a pore forming agent comprising cyclododecane. The plasticized ceramic precursor batch composition is capable of forming a porous ceramic article comprising a primary sintered phase composition.

In embodiments, the disclosure provides a method for manufacturing a porous ceramic honeycomb article. The method generally comprises first providing a plasticized ceramic forming precursor batch composition as summarized herein. A honeycomb green body can then be formed from the plasticized ceramic forming precursor batch composition. The honeycomb body can be dried under conditions to remove some or substantially all of the cyclododecane pore former prior to firing. The formed honeycomb green body can then be fired under conditions effective to convert the green body into a porous ceramic honeycomb article. Additional embodiments of the disclosure are set forth, in part, in the detailed description, and any claims, and in part from the detailed description, or can be learned by practice of the invention. The foregoing general description and the detailed description are intended to be illustrative and demonstrative, and non-limiting.

Singular forms "a," "an" and "the" include, plural referents unless the context clearly dictates otherwise. Thus, for example, reference to a "pore forming agent" includes embodiments having two or more such pore forming agents unless the context clearly indicates otherwise.

"Include," "includes," or like terms means including but not limited to.

Ranges can be expressed herein as from "about" one particular value, to "about" another particular value. When such a range is expressed, another embodiment includes from the one particular value to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

A "wt. %" or "weight percent" or "percent by weight" of a component, unless specifically stated to the contrary, is based on the total weight of the composition or article in which the component is included.

A "superaddition" refers to a weight percent of a component, such as for example, liquid vehicle, or pore former, based upon and relative to 100 weight percent of the ceramic forming inorganic powder batch component, such as an organic binder superaddition of 10 wt % to 100 wt % of the batch mixture resulting in a total weight percent of 110%.

"Optional" or "optionally" means that the subsequently described event or circumstance may or may not occur, and that the description includes instances where said event or circumstance occurs and instances where it does not.

"Pore fraction" refers to a percent by volume of the total porosity, as measured by mercury porosimetry, divided by 100. Accordingly, the parameters $d_{10}$, $d_{50}$, and $d_{90}$ are exemplary pore fractions that can be used to characterize the pore size distribution of ceramic articles manufactured by the batch compositions of the disclosure. The quantity $d_{50}$ is the median pore size based upon pore volume, and is measured in micrometers; thus, $d_{50}$ is the pore diameter at which 50% of the open porosity of the ceramic has been intruded by mercury. The quantity $d_{90}$ is the pore diameter at which 90% of the pore volume is comprised of pores whose diameters are smaller than the value of $d_{90}$; thus, $d_{90}$ is equal to the pore diameter at which 10% by volume of the open porosity of the ceramic has been intruded by mercury. The quantity $d_{10}$ is the pore diameter at which 10% of the pore volume is comprised of pores whose diameters are smaller than the value of $d_{10}$; thus, $d_{10}$ is equal to the pore diameter at which 90% by volume of the open porosity of the ceramic has been intruded by mercury. The values of $d_{10}$ and $d_{90}$ are also in units of micrometers. A pore size distribution or $d_{factor}$ can also be expressed by the quantity $(d_{50}-d_{10})/d_{50}$ and which describes the width of the distribution of pore sizes finer than the median pore size, $d_{50}$.

In embodiments, the disclosure provides improved ceramic precursor batch compositions suitable for forming porous ceramic articles comprised of a primary sintered phase ceramic composition. For example, the disclosed batch compositions can be used to form porous sintered phase ceramic articles having relatively high total porosities without a resulting generation of cracks. Still further, the batch compositions of the disclosure can also enable the use of simplified firing cycles to convert the batch compositions into primary sintered phase ceramic compositions. The ceramic precursor batch compositions generally comprise at least on ceramic forming inorganic batch component and a cyclododecane pore forming agent and can further include an optional liquid vehicle, and an optional organic binder system.

The ceramic forming inorganic batch components can be selected to form, upon firing; any desired porous sintered phase ceramic composition, including for example a porous cordierite, mullite, spinel, aluminum titanate, or a mixture thereof. Exemplary and non-limiting inorganic powder materials suitable for use in these inorganic ceramic powder batch mixtures can include, for example, cordierite, aluminum titanate, mullite, clay, kaolin, magnesium oxide sources, talc, zircon, zirconia, spinel, alumina forming sources, including aluminas and their precursors, silica forming sources, including silicas and their precursors, silicates, aluminates, lithium aluminosilicates, alumina silica, feldspar, titania, fused silica, nitrides, carbides, borides, e.g., silicon carbide, silicon nitride or mixtures of these.

In embodiments, the inorganic batch components can be selected to provide a primary sintered phase cordierite composition having the general formula $[A]_x[M]_y[T]_xO_{18}$, where A can be selected from the group consisting of alkali, alkaline earth, rare earth elements, $CO_2$, $H_2O$, and combinations thereof; M can be selected from the group consisting of Mg, Fe, Mn, Co, and combinations thereof; T is selected from the group consisting of Al, Si, Ga, Ge, and combinations thereof; and where $0 \leq x \leq 1.0$, $1.9 \leq y \leq 2.1$, and $8.9 \leq z \leq 9.1$. In embodiments, $0 \leq x \leq 0.05$, $1.98 \leq y \leq 2.02$, $8.98 \leq z \leq 9.02$, M can be comprised of Mg, and T can be comprised of Al, Si, or both. In embodiments, the cordierite composition can be approximately represented by the formula. $Mg_2Al_4Si_5O_{18}$.

Alternatively, an exemplary cordierite phase can be expressed and characterized on an oxide weight percent basis as comprising from about 49 to about 53 percent by weight $SiO_2$, from about 33 to about 38 percent by weight $Al_2O_3$, and from about 12 to about 16 percent by weight MgO. An exemplary inorganic cordierite precursor powder batch composition preferably comprises about 33 to about 41 weight percent aluminum oxide source, about 46 to about 53 weight percent of a silica source, and about 11 to about 17 weight percent of a magnesium oxide source. Additional exemplary and non-limiting inorganic batch component mixtures suitable for forming cordierite include those disclosed in U.S. Pat. Nos. 3,885,977; RE 38,888; 6,368,992; 6,319,870; 6,24,437; 6,210,626; 5,183,608; 5,258,150; 6,432,856; 6,773,657; 6,864,198; and U.S. Patent Application Publication Nos.: 2004/0029707; 2004/0261384. The cordierite ceramic phases described herein can also comprise either orthorhombic or hexagonal crystal lattice symmetry, or may be comprised of a mixture of both such crystal structures.

The inorganic batch components can also be selected to provide a ceramic mullite composition consisting essentially of, as characterized in an oxide weight percent basis, from 27 to 30 percent by weight $SiO_2$, and from about 68 to 72 percent by weight $Al_2O_3$. An exemplary inorganic mullite precursor powder batch composition can comprise approximately 76% mullite refractory aggregate; approximately 9.0% fine clay; and approximately 15% alpha alumina. Additional exemplary non-limiting inorganic batch component mixtures suitable for forming mullite include those disclosed in U.S. Pat. Nos. 6,254,822 and 6,238,618.

Still further, the inorganic batch components can also be selected to provide an alumina titanate composition consisting essentially of, as characterized in an oxide weight percent basis, from about 8 to about 15 percent by weight $SiO_2$, from about 45 to about 53 percent by weight $Al_2O_3$, and from about 27 to about 33 percent by weight $TiO_2$. An exemplary inorganic aluminum titanate precursor powder batch composition can comprise about 10% quartz; about 47% alumina; about 30% titania; and about 13% additional inorganic additives. Additional exemplary non-limiting inorganic batch component mixtures suitable for forming aluminum titanate include those disclosed in, for example, U.S. Pat. Nos. 4,483,944; 4,855,265; 5,290,739; 6,620,751; 6,942,713; 6,849,181; U.S. Patent Application Publication Nos.: 200410020846; 2004/0092381; and in PCT Application Publication Nos.: WO 2006/015240; WO 2005/046840; and WO 2004/011386.

An exemplary and non-limiting magnesium oxide source suitable for use in the batch composition can be talc. In embodiments, a suitable talc can have a mean particle size of at least about 5 μm, at least about 8 μm, at least about 12 μm, or even at least about 15 μm. Alternatively, the talc can be a platy talc. As used herein, a platy talc refers to talc that exhibits a platelet particle morphology, i.e., particles having two long dimensions and one short dimension, or, for example, a length and width of the platelet that is much larger than its thickness. In one aspect, the talc possesses a morphology index greater than about 0.50, 0.60, 0.70, or 80. The morphology index, as disclosed in U.S. Pat. No. 5,141,686, is a measure of the degree of platiness of the talc. One typical procedure for measuring the morphology index is to place the sample in a holder so that the orientation of the platy talc is maximized within the plane of the sample holder. The x-ray diffraction (XRD) pattern can then be determined for the oriented talc. The morphology index semi-quantitatively relates the platy character of the talc to its XRD peak intensities using the following equation:

$$M = \frac{I_x}{I_x + 2I_y}$$

where $I_x$ is the intensity of the peak and $I_y$ is that of the reflection. Examples of commercially available magnesium oxide sources suitable for use in the disclosure include, Mistron 002, FCOR Talc, or both, and are available from Luzenac, Inc. of Oakville, Ontario, Canada, and 96-67 Talc available from Barrett's Minerals, Inc. of Dillon, Mont.

Exemplary alumina forming sources can include aluminum oxides or a compound containing aluminum which when heated to sufficiently high temperature yields essentially 100% aluminum oxide. Non-limiting examples of alumina forming sources include corundum or alpha-alumina, gamma-alumina, transitional aluminas, aluminum hydroxide such as gibbsite and bayerite, boehmite, diaspore, aluminum isopropoxide and like materials. Commercially available alumina sources can include relatively coarse aluminas, such as the Alcan C-700 series, having a particle size of about 4-6 micrometers, and a surface area of about 0.5-1 $m^2/g$, e.g., C-714 and C-701™. Relatively fine aluminas, having a particle size of about 0.5-2 micrometers, and a surface area of about 8-11 $m^2/g$, can also be used, such as A10 and A-16SG alumina, available from Alcoa. In still another aspect, the alumina forming source can be a colloidal alumina having particles sizes in the range of from 20 nm to 50 nm, such as the AL20 available from Nyacol.

If desired, the alumina source can also comprise a dispersible alumina forming source. A dispersible alumina forming source can be, for example, an alumina forming source that is at least substantially dispersible in a solvent or liquid medium and that can be used to provide a colloidal suspension in a solvent or liquid medium. In one aspect, a dispersible alumina source can be a relatively high surface area alumina source having a specific surface area of, for example, at least 20 $m^2/g$. Alternatively, a dispersible alumina source can have a specific surface area of at least 50 $m^2/g$. In an exemplary aspect, a suitable dispersible alumina source for use in the methods of the disclosure comprises, for example, alpha aluminum oxide hydroxide (AlOOH.x.$H_2O$) commonly referred to as boehmite, pseudoboehmite, and as aluminum monohydrate. In another exemplary aspect, the dispersible alumina source can comprise the so-called transition or activated aluminas (i.e., aluminum oxyhydroxide and chi, eta, rho, iota, kappa, gamma, delta, and theta alumina) which can contain various amounts of chemically bound water or hydroxyl functionalities. Specific examples of commercially available dispersible alumina sources that can be used in the disclosure include, for example, Dispal Boehmite, commercially available from CONDEA Vista Company of Houston, Tex., and Alpha Alumina A1000, commercially available from Almatis, Inc.

A silica source can comprise clay, such as for example, raw kaolin, calcined kaolin, or mixtures thereof. Exemplary and non-limiting clays include non-delaminated kaolinite raw clay, having a particle size of about 7-9 micrometers, and a surface area of about 5-7 $m^2/g$, such as Hydrite MP™, those having a particle size of about 2-5 micrometers, and a surface area of about 10-14 $m^2/g$, such as Hydrite PX™ and K-10 raw clay, delaminated kaolinite having a particle size of about 1-3 micrometers, and a surface area of about 13-17 $m^2/g$, such as KAOPAQUE-10™, calcined clay, having a particle size of about 1-3 micrometers, and a surface area of about 6-8 $m^2/g$, such as Glomax LL. All of the above named clay materials are available from Dry Branch Kaolin, Dry Branch, Ga.

The silica source can further comprise, if desired, a silica raw material including fused $SiO_2$; colloidal silica; crystalline silica, such as quartz or cristobalite, or a low-alumina substantially alkali-free zeolite. A commercially available quartz silica forming source includes, for example, Cerasil 300, Unimim Silverbond 200, and Imsil A25 Silica available from, Laguna Clay Co., of Byesville, Ohio. In embodiments, the silica forming source can comprise a compound that forms free silica when heated, for example, silicic acid or a silicon organo-metallic compound.

An exemplary titania source can include, for example, rutile, anatase titania, or combinations thereof. In embodiments, optimization of the median particle size of the titania source can be used to avoid entrapment of unreacted oxide by the rapidly growing nuclei in the sintered ceramic structure. Accordingly, in embodiments, it may be preferred for the median particle size of the titania to be up to about 20 micrometers.

In embodiments, the inorganic batch components can optionally comprise one or more pre-reacted inorganic refractory fillers. Exemplary pre-reacted inorganic refractory fillers can include powders of silicon carbide, silicon nitride, cordierite, aluminum titanate, calcium aluminate, beta-eucryptite, and beta-spodumene, as well as refractory aluminosilicate fibers formed, for example, by the processing of aluminosilicate clay.

The ceramic precursor batch composition can further comprise cyclododecane as a pore forming agent. The cyclododecane pore forming agent or pore former is a fugitive material which evaporates or otherwise undergoes vaporization during drying or heating of the green body to obtain a desired, usually higher porosity, coarser median pore diameter, or both. The use of a pore former enables one to tailor the porosity and pore size distribution in the resulting fired body for a particular application. Cyclododecane exhibits a relatively low melting point, in the range of about 58-63° C., a vapor pressure at room temperature of about 0.1 hPa, and can be readily shaped to form spherical granules. Exemplary shaping techniques can include prilling from molten materials, grinding, spray drying, and like techniques. U.S. Pat. No. 5,185,108, describes exemplary methods for preparing wax particles having the appropriate size. Cyclododecane is commercially available from, for example, HANGLEITER Gmbh, Otzberg, Germany.

The cyclododecane can be utilized in any desired amount. However, in embodiments, the cyclododecane can be presented as a superaddition in an amount of from about 20 weight percent to about 80 weight percent, including exemplary superaddition amounts such as 25 weight percent, 30 weight percent, 35 weight percent, 40 weight percent, 45 weight percent, 50 weight percent, 55 weight percent, 60 weight percent, 65 weight percent, 70 weight percent, 80 weight percent, intermediate amounts, and any range of amounts within these values.

The use of cyclododecane as a pore forming agent in the batch compositions of the disclosure provides the ability to remove or evacuate the pore former during the drying step and prior to firing and reduced the formation of undesired cracks in the resulting fired ceramic structure. Further, evacuated or removed cyclododecane can, if desired, be recovered from the burn out or removal process and subsequently reused, thus reducing the costs associated with the use of conventional unrecoverable pore forming agents.

When used in particulate form, the cyclododecane can be shaped and sized according to any predetermined specifications, further enabling one to obtain any desired pore structure properties, including for example, total porosity and mean pore size. In one exemplary and non-limiting embodiment, the cyclododecane can be present in particulate form, where the particles are substantially spherical in shape. Alternatively, in another non-limiting and exemplary embodiment, the cyclododecane particles can be substantially irregular or non-spherical in shape. Likewise, the cyclododecane particles can have any desired size, commonly characterized by the median particle diameter $dp_{50}$. In exemplary embodiments, the cyclododecane particles can have a median particle size of from 15 µm to about 120 µm, including for example, 25 µm, 35 µm, 45 µm, 55 µm, 60 µm, 65 µm, 75 µm, 85 µm, 95 µm, 105 µm, 115 µm, intermediate particle sizes and particle sizes in any range of sizes within these values. For example, in embodiments, the cyclododecane particles can have a median particle size $dp_{50}$ of from about 80 μm to about 120 μm, about 90 μm to about 110 μm, or even about 95 μm to about 105 μm.

The inorganic batch components and the cyclododecane pore former component can be intimately blended with an optional organic binder, optional liquid vehicle, and one or more optional forming aids to impart plastic formability and green strength to the raw materials when they are shaped into a body. Exemplary organic binders can include cellulose ether such as methylcellulose, hydroxypropyl methylcellulose, methylcellulose derivatives, or combinations thereof. The relative amounts of binder can vary depending on factors such as the nature and amounts of raw materials used. However, in embodiments, the binder can be present in the batch composition as a superaddition in an amount of from about 2 wt % to about 10 wt %.

The optional liquid vehicle component can also vary in amount and kind depending on the type of material used and to impart superior handling properties and compatibility with the other components in the ceramic batch mixture. If used, the liquid vehicle can be present as a superaddition in the range of from about 20 wt % to about 50 wt %. In embodiments, the liquid vehicle component can comprise water. However, in embodiments, an organic solvent, for example, methanol, ethanol, and like solvents, or a mixture thereof, can also be used as the liquid vehicle.

Optional forming or processing aids can also include, for example, lubricants, surfactants, plasticizers, sintering aids, and even pore forming agents in addition to the cyclododecane. Additional pore formers can include, for example, carbon, graphite, starch, wood, shell, nut flour, polymers such as polyethylene beads, waxes; or like materials, and combinations thereof. To that end, when used, these additional pore formers can also be presized or shaped to provide a subsequent porosity having desired characteristics. Exemplary lubricants can include, for example, hydrocarbon oil, tall oil, sodium stearate, or like materials, and combinations thereof. An exemplary plasticizer for use in preparing the batch composition can include, for example, glycerine, or like materials. Other suitable sintering aids can generally include, for example, an oxide source of one or more metals such as strontium, barium, iron, magnesium, zinc, calcium, aluminum, lanthanum, yttrium, titanium, bismuth, tungsten or like materials, and combinations thereof. In embodiments, a superior optional sintering aid can comprise, for example, a mixture of a strontium oxide source, a calcium oxide source, an iron oxide source, or like materials, and combinations thereof. In embodiments, an optional sintering aid can comprise at least one rare earth metal, and combinations thereof. The sintering aid can be added to the batch composition, for example, in powder form, liquid form, or in combination.

Once the components of the batch composition have been blended, the resulting ceramic precursor batch composition can be shaped into a green body by any known conventional forming process, e.g., extrusion, injection molding, slip casting, centrifugal casting, pressure casting, dry pressing, and like methods. In an exemplary aspect, extrusion can be done using a hydraulic ram extrusion press, or a two stage de-airing single auger extruder, or a twin screw mixer with a die assembly attached to the discharge end, or like implementations. In the twin screw mixer example, proper screw elements are selected according to material considerations and other process conditions to build up sufficient pressure to force the batch material through the die.

In embodiments, the batch compositions of the disclosure can be used to form multicellular honeycomb structures having a high filter volumetric heat capacity, a low pressure drop between the entrance and exit faces of the filter, a low coefficient of thermal expansion (CTE), and high filtration efficiency, and are thus well suited for use as diesel particulate filters. In one aspect the blended ceramic precursor batch composition can be formed or otherwise shaped into a honeycomb configuration. The geometry of the honeycomb configuration need not be restricted to any particular configuration. However, in embodiments, an exemplary formed honeycomb body can be configured to provide a wall flow filter comprising a plurality of cell channels bounded by porous channel walls that extend longitudinally from an upstream inlet end to a downstream outlet end. A first portion of the plurality of cell channels can comprise an end plug sealed to the respective channel walls at the downstream outlet end to form exhaust gas flow inlet cell channels and a second portion of the plurality of cell channels can comprise an end plug sealed to the respective channel walls at the upstream inlet end to form exhaust gas flow outlet cell channels.

The formed honeycomb structure can, for example, be a cylinder having end surfaces with a shape of a circle or an ellipse, a prism having the end surfaces with a shape of a polygon such as a triangle or a square, a shape in which the sides of cylinders or prisms are bent like a "doglegged" shape, or like shapes. In addition, the shape of through holes or exhaust gas inlet and outlets is not particularly limited. For example, the cross-sectional shape may be a polygon such as a square, an octagon, a circle, an ellipse, or like shapes, and combinations thereof.

Exemplary non-limiting examples of formed honeycombs produced by the process and batch compositions of the disclosure generally comprise cell densities of from about 235 cells/cm$^2$ (about 1,500 cells/in$^2$) to about 15 cells/cm$^2$ (about 100 cells/in$^2$), including those having about 94 cells/cm$^2$ (about 600 cells/in$^2$), about 62 cells/cm$^2$ (about 400 cells/in$^2$), or about 47 cells/cm$^2$ (about 300 cells/in$^2$), those having about 31 cells/cm$^2$ (about 200 cells/in$^2$), or those having about 15 cells/cm$^2$ (about 100 cells/in$^2$). Further, the wall or web thicknesses can typically be from about 0.07 to about 0.6 mm (about 3 to about 25 mils). However, the particular desired size and shape of the ceramic body can depend on the application, e.g., in automotive applications by engine size and space available for mounting, and like considerations. Although the ceramic articles of the disclosure can be suitable for preparing thin-walled honeycombs, the disclosed mixtures can also be used for thicker walled structures. For example, honeycombs structures having about 15 to about 30 cells/cm$^2$ (about 100 to about 200 cells/in$^2$) and about 0.30 to about 0.64 mm (about 12 to about 25 mil) wall thicknesses are well suited for diesel particulate filter applications.

The formed green body having a desired size and shape as disclosed herein can then be dried under conditions effective to remove any excess liquids, such as moisture, and to remove the cyclododecane pore former. The drying conditions can depend, at least in part, upon the particular choice of materials used to prepare the batch composition. However, in embodiments, suitable drying conditions can comprise, for example, heating the formed green body at a temperature of about 50° to about 150° C. for a sufficient time to eliminate the fugitive cyclododecane pore former. Sufficient time can also vary but, in embodiments, can be, for example, from about 24 to about 72 hours. The drying step can be performed by any known means, including hot air, microwave, steam, or dielectric drying, or like methods, and can optionally be followed by ambient air drying.

Once dried, the dried green body can be fired under conditions effective to convert the dried green body into a ceramic article comprising a primary crystalline phase ceramic composition. The firing conditions effective to convert the green body into a ceramic article can vary depending on a number of conditions, such as the specific composition, size of the green body, the type of equipment used, and like considerations. Therefore, excellent firing conditions to obtain a ceramic article according to the disclosure can be readily ascertained However, for batch compositions used to form mullite, exemplary firing conditions can be, for example, heating at a maximum soak temperature of about 1,400° C. to about 1,600° C., and for a maximum soak time about 1 hour to about 6 hours. Alternatively, for batch compositions that are primarily for forming cordierite, exemplary firing conditions can be, for example, heating the green body at a maximum soak temperature of about 1,350° C. to about 1,450° C. and for a maximum soak time of from about 5 to about 50 hours, including exemplary ranges of 10 to 40 hours, or even 15 to 30 hours. In embodiments, an exemplary firing schedule for cordierite forming compositions can include firing at a soak temperature of about 1,400° C. to about 1,425° C. for a hold or soak time of about 10 to about 35 hours.

The resulting fired ceramic bodies of the disclosure can exhibit total porosities % P, as measured by mercury porosimetry, of about 50% to about 80%, including total porosities of, for example, 55%, 60%, 65%, 70%, 75%, and intermediate porosities values. For example, in embodiments, the total porosity can be, for example, of about 55% to about 75%, of about 60% to about 70%, or like porosities.

The median pore diameter, $d_{50}$, of the pores present in the resulting ceramic articles can be, for example, from about 8 µm to about 3 µm. More preferably, the median pore diameter can be from about 10 µm to about 30 µm, or from about 15 µm to about 25 µm.

EXAMPLES

To further illustrate the disclosure, the following examples provide those of skilled in the art with a complete description of how the ceramic precursor batch compositions, ceramic articles, and methods can be accomplished and evaluated. They are exemplary and non-limiting. Efforts have been made to ensure accuracy with respect to numbers (e.g., amounts, temperatures, etc.); however, some variation or deviation may be present. Unless indicated otherwise, parts are parts by weight, temperature is degrees C. or is ambient temperature, and pressure is at or near atmospheric.

In the following examples, a series of seven cordierite forming batch compositions were prepared. All seven batch formulation were prepared from a raw material mixture containing 38.5 wt % of a 22 micron talc screened to −325 mesh, 12.5 wt % of an 10 micron kaolin, 12.4 wt % of a 9 micron corundum screened to −325 mesh, 21.0 wt % of a 4.6 micron aluminum hydroxide, 15.4 wt % of a 25 micron quartz powder. The resulting mixtures were also blended with 4.45 wt % methylcellulose binder and 0.56 wt % sodium stearate lubricant. To obtain comparative results, batch compositions 1, 2 and 5 each contained a 40.0 wt % superaddition of a 49 micron potato starch. Examples 3, 4, 6, and 7 each contained a 40.0 wt % superaddition of cyclododecane.

Figure 2:
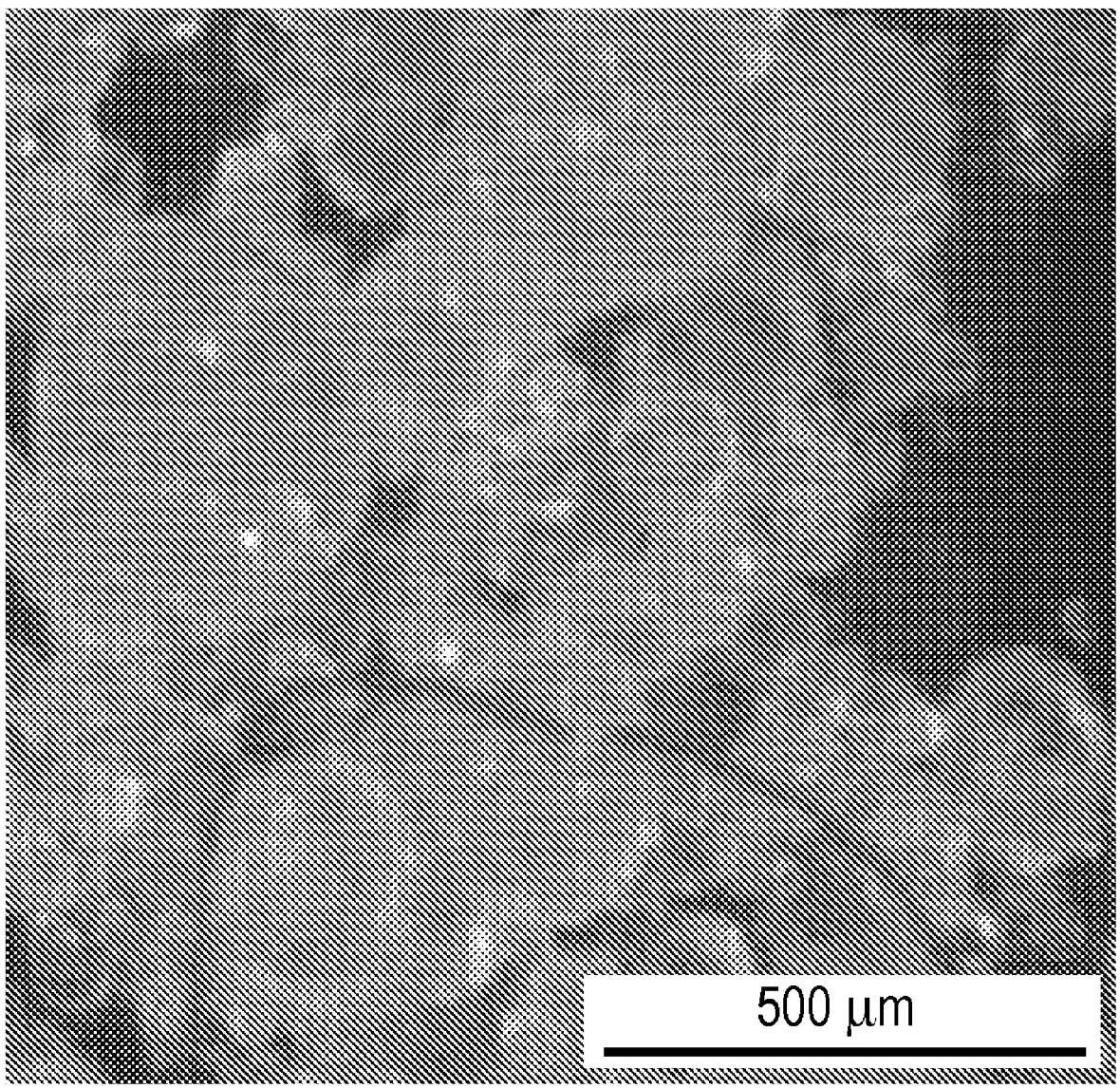
FIG. 2 illustrates exemplary spherical cyclododecane particles.

Prior to use, large pieces of initial cyclododecane wax were crushed in small pieces (flecks) of several millimeters with a hammer. The flecks were then introduced in a laboratory chopper and grinded for approximately 30 seconds to provide powdered cyclododecane having a particle diameters of about 100 µm. The final powdered cyclododecane is illustrated in FIG. 1. The preparation of the powder could be further refined to obtain more spherical forms using other methods, for example prilling. Exemplary spherical powdered cyclododecane is illustrated in FIG. 2.

Distilled water was also added to each batch composition in a stainless steel muller until the batch was of a suitable plasticity to be extruded. The wet batch compositions were then extruded to form a 2-inch diameter honeycomb with approximately 275 cells per square inch and 0.016-inch thick walls. The extruded honeycomb bodies were then dried and fired according to the drying and firing schedules in Table 1. The resulting ceramic honeycomb articles were then evaluated for several physical performance properties, including coefficient of thermal expansion, pore microstructure, and modulus of rupture, the results are contained in Table 1. The coefficient of thermal expansion (CTE) was obtained by dilatometry on a specimen parallel to the lengths of the channels of the honeycomb article ("axial direction") over the temperature range of 25 to 800° C. and in units of $10^{-7}/°$ C. The % porosity describes the total volume percentage of porosity in the walls of the article as measured by mercury porosimetry. The terms $d_{10}$, $d_{50}$, and $d_{90}$ denote the pore diameters, in microns, or micrometers ($10^{-6}$ meters), at which 10%, 50%, and 90% of the total pore volume are of a finer pore diameter, respectively, as measured by mercury porosimetry. Thus, for example, $d_{90}$ is the pore diameter at which 90% (by volume) of the pores have a smaller diameter (equal to the pore diameter at which the cumulative mercury intrusion volume equals 10% of the total mercury intrusion volume). All modulus of rupture (MOR), or flexural strength, values were measured at room temperature by the four-point method on a cellular bar (0.5 inch×0.25 inch×3 inches long) parallel to the axial direction of the honeycomb.

A review of the results obtained in Table 1 indicate properties that can be obtained by the use of the cyclododecane pore former in the manufacture of porous ceramic articles. For example, batch compositions 2 and 5 report properties achieved in a ceramic article that was fired in an electrical furnace utilizing two different ramps of heating. As indicated, even for a slower ramping rate, a significant level of cracks, precluding any CTE or strength measurements, were present when potato starch was used as the pore former to achieve desired porosity. In contrast, batch composition 3, which utilized cyclododecane as the pore former, provided desirable properties without the formation of cracks. Further, batch composition 4, which also comprised cyclododecane, provided properties similar to those of batch composition 3, except for the formation of cracks during the firing process. However, the generation of cracks was believed to be a result of the batch composition being fired in a wet state without having been dried to remove the cyclododecane prior to firing.

Figure 3:
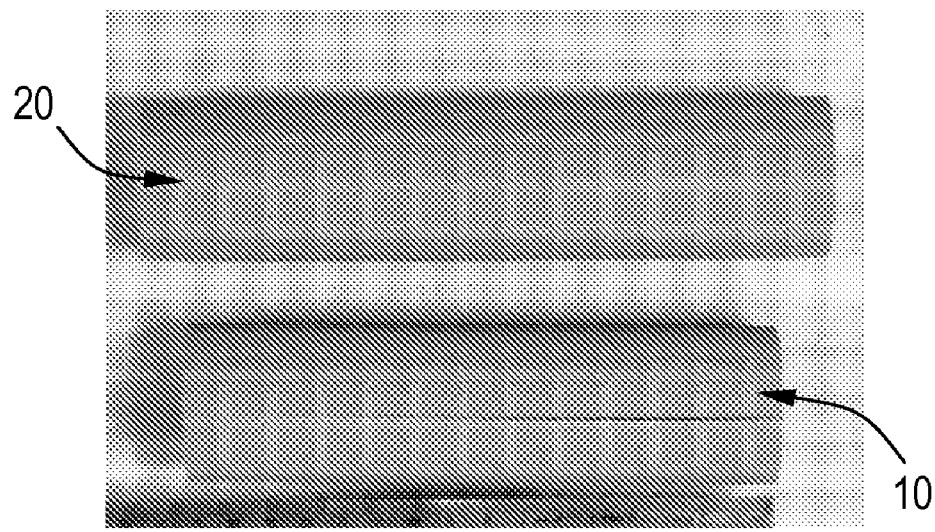
FIG. 3 illustrates a comparison of the two ceramic honeycomb bodies prepared in Examples 5 and 6.
Figure 4:
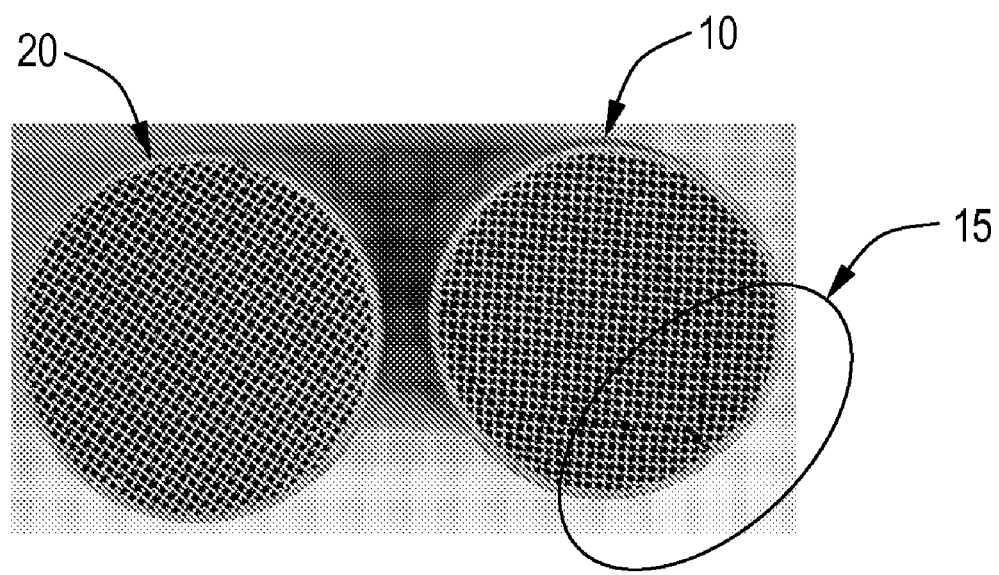
FIG. 4 illustrates a comparison of the two ceramic honeycomb bodies prepared in Examples 5 and 6.
Figure 5:
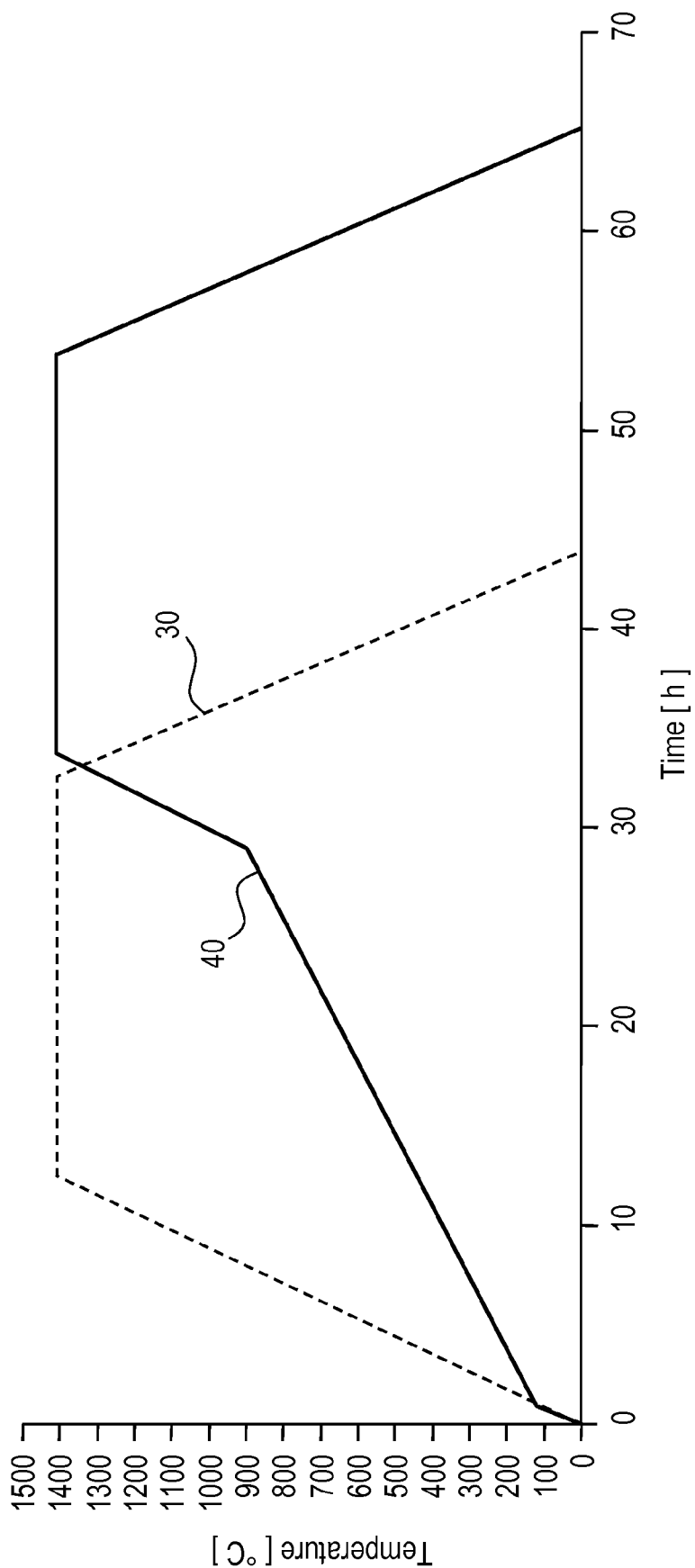
FIG. 5 is a graphical comparison of two exemplary firing schedules used to fire certain batch composition in the appended Examples.

A review of batch composition 6 also illustrates that when the cyclododecane pore former was used, a firing cycle including a faster ramp of heating rate can be employed to sinter the body without the formation of undesirable cracks. In contrast, as described above, batch composition 5, comprising potato starch as the pore former, resulted in a sintered composition exhibiting cracks which precluded any CTE or strength measurements. This comparison can be seen in FIG. 3 and FIG. 4. As shown in FIG. 3, the honeycomb article 10 comprised of 40% potato starch and corresponding to batch composition 5, contains a large crack along the exterior surface or skin of the article. In contrast, the honeycomb article 20 including 40% cyclododecane and the corresponding article produced from batch composition 6, did not exhibit any cracks. Likewise, as shown in FIG. 4, the honeycomb article 10 comprised of 40% potato starch and again corresponding to batch composition 5, contained a large series of cracks along a portion of the honeycomb channel walls, indicated by the circled region 15. In contrast, the honeycomb article 20 including 40% cyclododecane and corresponding to the article produced from batch composition 6, did not exhibit any cracks. FIG. 5 further illustrates schematically a cyclododecane can be evacuated during the drying process conducted in hot air at about 80° C. for about 48 hours The disclosure has been described with reference to various specific embodiments and techniques. However, many variations and modifications are possible while remaining within the spirit and scope of the disclosure.

TABLE 1

|  | Example Number | | | | | | |
|---|---|---|---|---|---|---|---|
|  | 1 | 2 | 3 | 4 | 5 | 6 | 7 |
| Wt % Potato starch | 40 | 40 | 0 | 0 | 40 | 0 | 0 |
| Wt % Cyclododecane | 0 | 0 | 40 | 40 | 0 | 40 | 40 |
| Drying Condition | Dry | Dry | Dry | Wet | Dry | Dry | Wet |
| Firing Cycle | #1 | #2 | #2 | #2 | #3 | #3 | #3 |
| 0-150° C. Rate (° C./h) | 120 | 120 | 120 | 120 | 120 | 120 | 120 |
| 150-800° C. Rate (° C./h) | 27 | 27 | 27 | 27 | 120 | 120 | 120 |
| 800-900° C. Rate (° C./h) | 37 | 27 | 27 | 27 | 120 | 120 | 120 |
| 1150-1350° C. Rate (° C./h) | 25 | 109 | 109 | 109 | 120 | 120 | 120 |
| 1350-Tmax Rate (° C./h) | 5 | 109 | 109 | 109 | 120 | 120 | 120 |
| Hold Temperature (° C.) | 1409 | 1409 | 1409 | 1409 | 1409 | 1409 | 1409 |
| Hold Time (h) | 11 | 20 | 20 | 20 | 20 | 20 | 20 |
| % Porosity | 66.1 | 62.7 | 67.8 | 67.7 | 64.3 | 67.4 | 68.3 |
| $d_{10}$ (μm) | 8.0 | 20.4 | 16.6 | 15.5 | 16.8 | 14.2 | 15.5 |
| $d_{50}$ (μm) | 16.5 | 30.7 | 32.6 | 30.5 | 25.0 | 29.0 | 30.6 |
| $d_{90}$ (μm) | 33.0 | 56.6 | 87.9 | 79.7 | 51.5 | 77.6 | 82.6 |
| $(d_{50} - d_{10})/d_{50}$ | 0.51 | 0.34 | 0.49 | 0.49 | 0.33 | 0.51 | 0.49 |
| $(d_{90} - d_{50})/d_{50}$ | 1.00 | 0.84 | 1.69 | 1.61 | 1.06 | 1.67 | 1.70 |
| $(d_{90} - d_{10})/d_{50}$ | 1.51 | 1.18 | 2.18 | 2.11 | 1.39 | 2.18 | 2.20 |
| PCF (pore connectivity factor) | 43.8 | 53.1 | 31.1 | 32.1 | 46.3 | 30.9 | 31.0 |
| CTE, 25-800° C. ($10^{-7}$/° C.) | 8.0 | Cracked | 12.4 | Cracked | — | 11.1 | — |
| CTE, 500-900° C. ($10^{-7}$/° C.) | 15.5 | Cracked | 18.7 | Cracked | — | 18.8 | — |
| MOR (psi) | 318 | Cracked | 321 | Cracked | — | 364 | — | comparison of the relatively faster firing cycle 3, utilized for the firing of batch compositions 5, 6, and 7, compared to the slower firing cycle 2 used for the firing of batch composition 2, 3 and 4. Firing cycle 3 is schematically represented by line 30. Firing cycle 2 is schematically represented by line 40.

Accordingly, the data reported in Table 1 demonstrate that cyclododecane can be used as a pore former to successfully achieve high porosities while all other properties remain acceptable and comparable to those obtained if potato starch is selected. In addition, faster ramp of heating can be achieved without concern for the generation of cracks.

Figure 6:
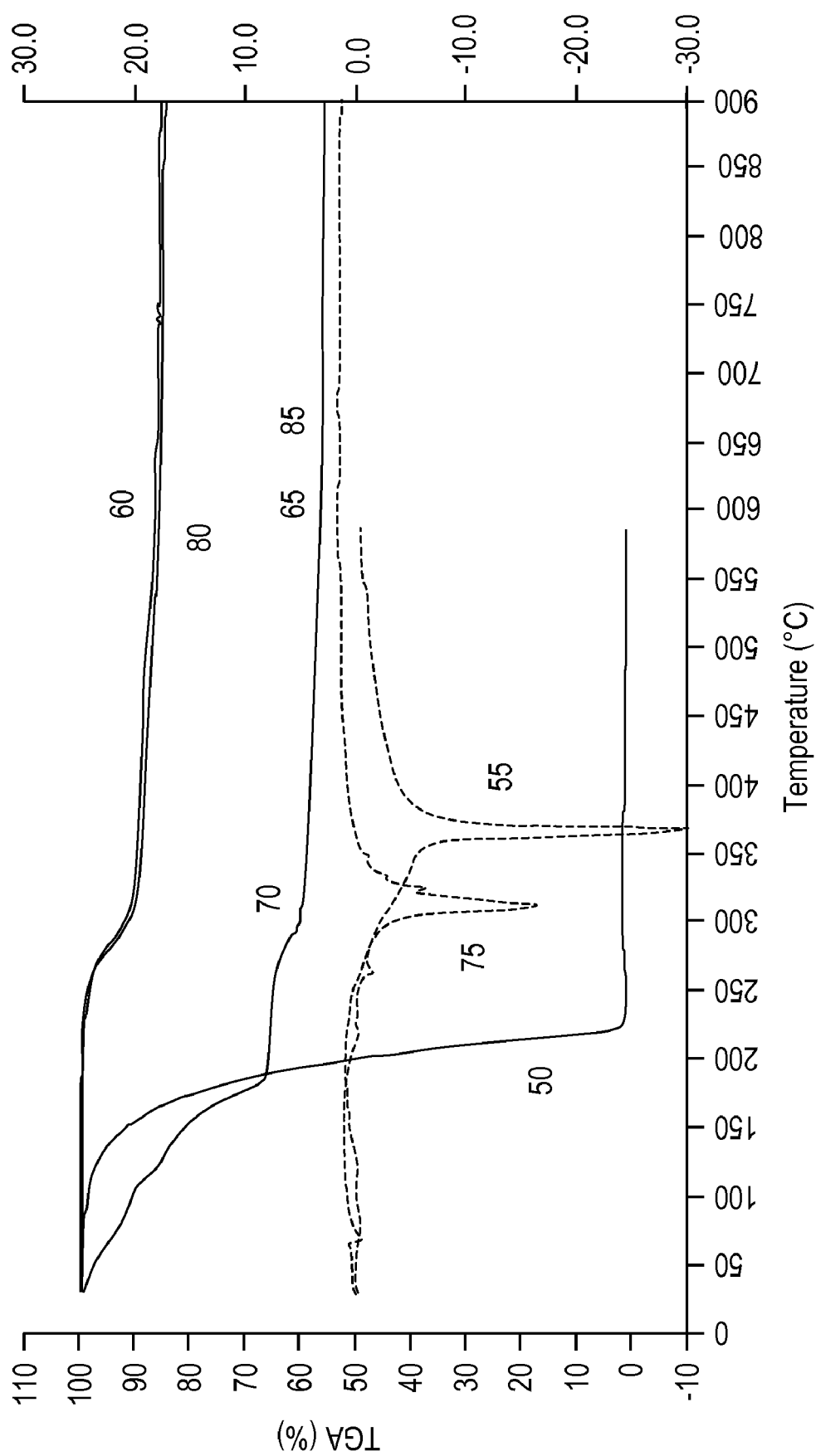
FIG. 6 is an illustration of the TGA weight loss and DSC thermal phenomenon in the heating of cyclododecane alone, an exemplary cordierite green body without any pore former (HP 300), and cordierite green body comprising a superaddition of 40 wt % cyclododecane, before and after drying.

In a subsequent study, the TGA weight losses and DSC thermal phenomenon that occurred during the heating of cyclododecane alone, an exemplary cordierite green body without any pore formers and cordierite green body including a superaddition of 40 wt % cyclododecane, before and after drying, were evaluated. The results are reported on graph of FIG. 6.

As shown by curves 50 and 55, cyclododecane can be evacuated at relatively low temperatures, such as below about 250° C., and presents an endothermic peak at about 360° C. The heating of the dry green cordierite parts without pore formers shows a decrease of weight occurring between about 250° C. and about 300° C. corresponding to the burn-out of organic binders, as shown by curves 60 and 65. The heating of wet cordierite green parts comprising 40% of cyclododecane exhibits losses between room temperature and about 350° C. due to removal of water, binders and the cyclododecane, as shown by curves 70 and 75. The removal of the cyclododecane can be also seen referring to the endothermic peak occurring at about 300 to about 320° C. As shown by curves 80 and 85, the heating of the dry part including 40% of cyclododecane follows a curve similar to that obtained for the dry green part without any pore formers. These results indicate that

The invention claimed is:

1. A plasticized ceramic precursor batch composition comprising:
   ceramic forming inorganic batch components; and
   a pore forming agent consisting essentially of cyclododecane,
   wherein the cyclododecane has a median particle size $d_{50}$ of from about 90 μm to about 110 μm.

2. The plasticized ceramic precursor batch composition of claim 1, wherein the ceramic forming inorganic batch components are selected to provide a sintered phase cordierite composition during firing.

3. The plasticized ceramic precursor batch composition of claim 2, wherein the sintered phase cordierite composition is characterized on an oxide weight basis as consisting essentially of:
   about 49 to about 53 percent by weight $SiO_2$,
   about 33 to about 38 percent by weight $Al_2O_3$, and
   about 12 to about 16 percent by weight MgO.

4. The plasticized ceramic precursor batch composition of claim 1, wherein the ceramic forming inorganic batch components are selected to provide a sintered phase mullite composition during firing.

5. The plasticized ceramic precursor batch composition of claim 1, wherein the ceramic forming inorganic batch components are selected to provide a sintered phase aluminium titanate composition during firing.

6. The plasticized ceramic precursor batch composition of claim 1, wherein the ceramic forming inorganic batch components are selected to provide a sintered phase silicon carbide composition during firing.

7. The plasticized ceramic precursor batch composition of claim 1, wherein the cyclododecane is present as substantially spherical particles.

8. The plasticized ceramic precursor batch composition of claim 1, wherein the batch composition is formed into a predetermined shape.

9. The plasticized ceramic precursor batch composition of claim 8, wherein the predetermined shape is a honeycomb structure.

10. The plasticized ceramic precursor batch composition of claim 1, further comprising a liquid vehicle and an organic binder system.

11. A method for manufacturing a porous ceramic honeycomb article, comprising the steps of:
providing a plasticized ceramic forming precursor batch composition of claim 1, comprising:
ceramic forming inorganic batch components; and
a pore forming agent comprising cyclododecane;
forming a honeycomb green body from the plasticized ceramic forming precursor batch composition; and
firing the honeycomb green body under conditions effective to convert the green body into a porous ceramic honeycomb article.

12. The method of claim 11, wherein the plasticized ceramic forming precursor batch composition comprises ceramic forming inorganic batch components selected to provide at least one of a sintered phase cordierite composition, sintered phased mullite composition, a sintered phase aluminium titanate composition, or combinations thereof.

13. The method of claim 12, wherein the ceramic forming inorganic batch components are selected to provide a sintered phase cordierite composition, as characterized on an oxide weight basis, consisting essentially of:
about 49 to about 53 percent by weight $SiO_2$;
about 33 to about 38 percent by weight $Al_2O_3$; and
about 12 to about 16 percent by weight MgO.

14. The method of claim 11, wherein the cyclododecane pore former is present in the plasticized ceramic forming precursor batch composition having a predetermined size and shape.

15. The method of claim 14, wherein the cyclododecane pore former is present in the plasticized ceramic forming precursor batch composition as substantially spherical particles.

16. The method of claim 15, wherein the substantially spherical cyclododecane particles have a median particle size $dp_{50}$ of from about 90 μm to about 110 μm.

17. The method of claim 11, wherein the step of forming the honeycomb green body comprises shaping the plasticized ceramic forming precursor batch composition into a honeycomb shape, and drying the shaped plasticized ceramic forming precursor composition under conditions effective to at least remove some of the cyclododecane pore former.

18. The method of claim 11, wherein the effective firing conditions comprise firing the honeycomb green body at a soak temperature at from about 1300° C. to about 1450° C., and subsequently holding the soak temperature for a period of time sufficient to convert the honeycomb green body into a ceramic honeycomb article.

19. The method of claim 18, wherein the soak temperature is achieved by increasing temperature from 1150° C. to the soak temperature at a rate of increase greater than 100° C. per hour.

20. The method of claim 11, wherein the plasticized ceramic forming precursor batch composition further comprises a liquid vehicle and an organic binder system.

21. The method of claim 11 wherein the step of forming the honeycomb green body comprises shaping and then drying the shaped plasticized ceramic forming precursor composition under conditions effective to remove substantially all of the cyclododecane pore former.

22. A porous ceramic honeycomb article manufactured by the method of claim 11.

23. The porous ceramic honeycomb article of claim 22, having a total porosity (% P) of from about 60% to about 70%, and a median pore size ($d_{50}$) of from about 15 μm to about 25 μm.

24. A green honeycomb article, comprising a plasticized ceramic precursor batch composition of claim 1.

* * * * *